March 31, 1959 J. V. EAKIN 2,879,868
MECHANICAL UNIT COMPRISING A ROTARY-SEAL AND A TIMING DEVICE
Filed April 1, 1955 3 Sheets-Sheet 2

INVENTOR.
JOHN V. EAKIN
BY Willard D. Eakin

ATTORNEY

INVENTOR.
JOHN V. EAKIN
BY Willard D. Eakin
ATTORNEY

United States Patent Office 2,879,868
Patented Mar. 31, 1959

2,879,868

MECHANICAL UNIT COMPRISING A ROTARY-SEAL AND A TIMING DEVICE

John V. Eakin, Rocky River, Ohio, assignor to Fawick Corporation, a corporation of Michigan Application April 1, 1955, Serial No. 498,475

3 Claims. (Cl. 192—12)

This invention relates to a mechanism such as a motor driven press having a pneumatically controlled clutch for connecting the crank-shaft of the press with a clutch member constantly driven by the motor for closing the press and for disconnecting the two at the end of each revolution of the crank-shaft, a brake for stopping and holding the crank-shaft upon its being released by the clutch, and means, automatic as to releasing, stopping and holding the crank-shaft, for actuating the clutch and the brake in proper sequence. The pneumatically controlled clutch comprises a fluid "motor" requiring to be charged and vented during its rotation, which calls for a rotary slip-seal fluid-conducting device.

My chief object is to provide an assembly in which mechanical parts of the timing device are combined, in a single, manually manipulatable unit, with the rotary-seal device, so that the combination unit can be handled, stored and shipped as such and can be applied to the press or the like by a single mounting operation.

Further objects are simplicity, lightness, compactness, economy and durability.

Figure 1:
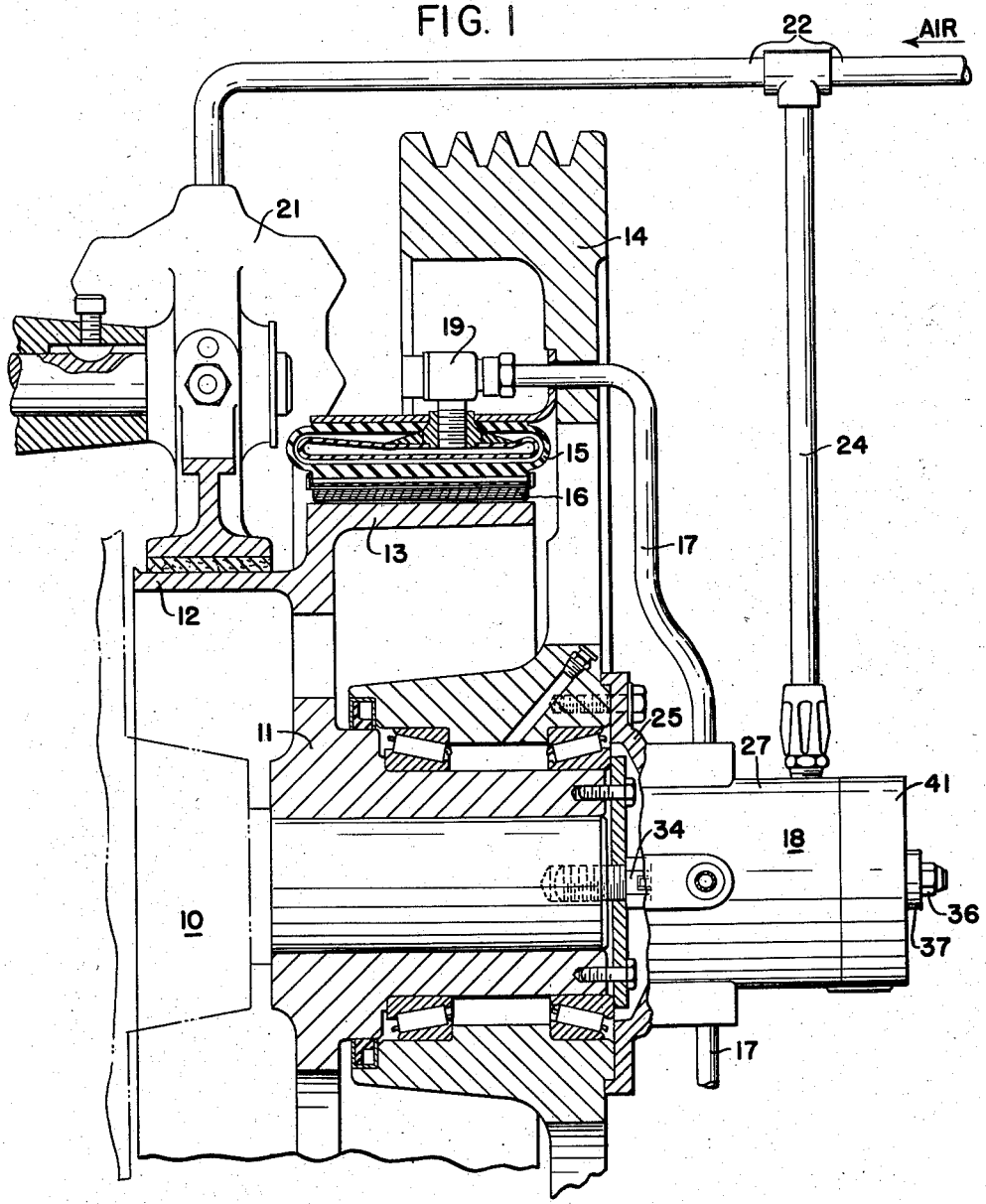
Fig. 1 is an axial section, on line 1—1 of Fig. 4, of parts of a press assembly embodying my invention in its preferred form.

Referring primarily to Fig. 1, the press comprises the usual crank-shaft 10, having keyed upon it a hub-like member 11 formed with a brake-drum part 12 and a clutch-drum part 13.

Journaled upon a small-diameter part of the member 11 is a driving belt-pulley 14 on a side face of which is mounted a pneumatic clutch element of known construction comprising an inwardly distensible or constricting-type annular rubber bag 15 provided with the usual wear shoes 16 for engaging the clutch drum 13, the bag being adapted to be charged and vented by preferably a plurality of pipes 17, 17 leading from a rotary part of the rotary-seal device, 18, and, through the usual quick-release valves, such as the valve 19, to the bag.

Figure 2:
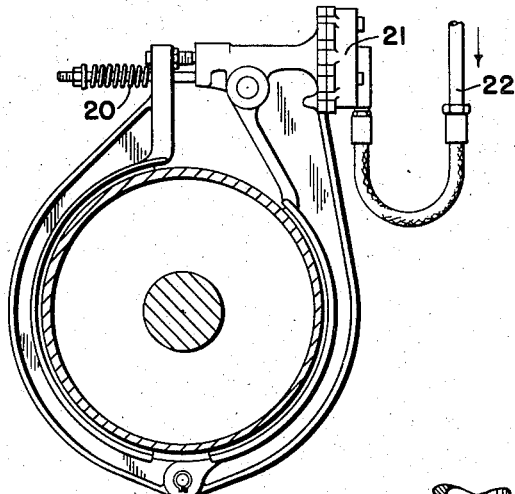
Fig. 2 is an elevation, on a small scale, with parts in section, of a brake assembly of which parts are shown also in Fig. 1.

The brake assembly for coacting with the brake drum 12, Figs. 1 and 2, of known construction, is of the spring-engaged, fluid-released type, having a compression spring 20, Fig. 2, for engaging it and a pressure fluid cylinder 21 for releasing it, the cylinder being adapted to be charged and vented through a pipe 22.

Figure 4:
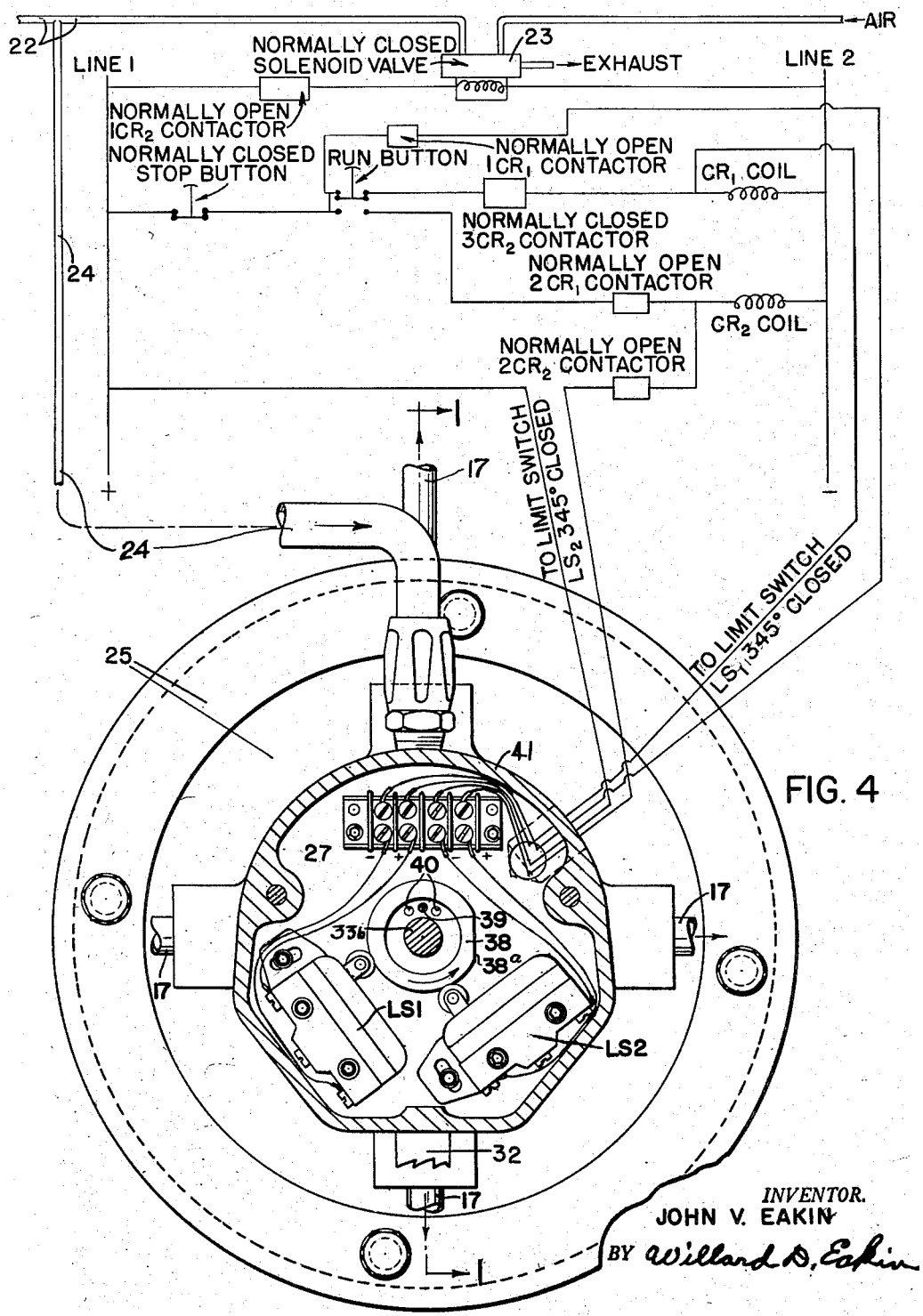
Fig. 4 is a section, on a large scale, on line 4—4 of Fig. 3 and includes a small scale diagram of a control valve for effecting actuation of the clutch and brake and electric devices controlled by the timing mechanism for opening and closing the valve.

For concurrently charging the bag 15 to engage the clutch and the cylinder 21 for releasing the brake, to start each revolution of the crank-shaft 10, and for concurrently venting the bag 15 to release the clutch and the cylinder 21 for permitting the spring 20 to engage the brake, the cylinder's pipe 22 leads from a three-way control valve 23, Fig. 4, and from the pipe 22, Figs. 1 and 4, a branch pipe 24 leads to a non-rotary part of the rotary-seal device 18.

Figure 3:
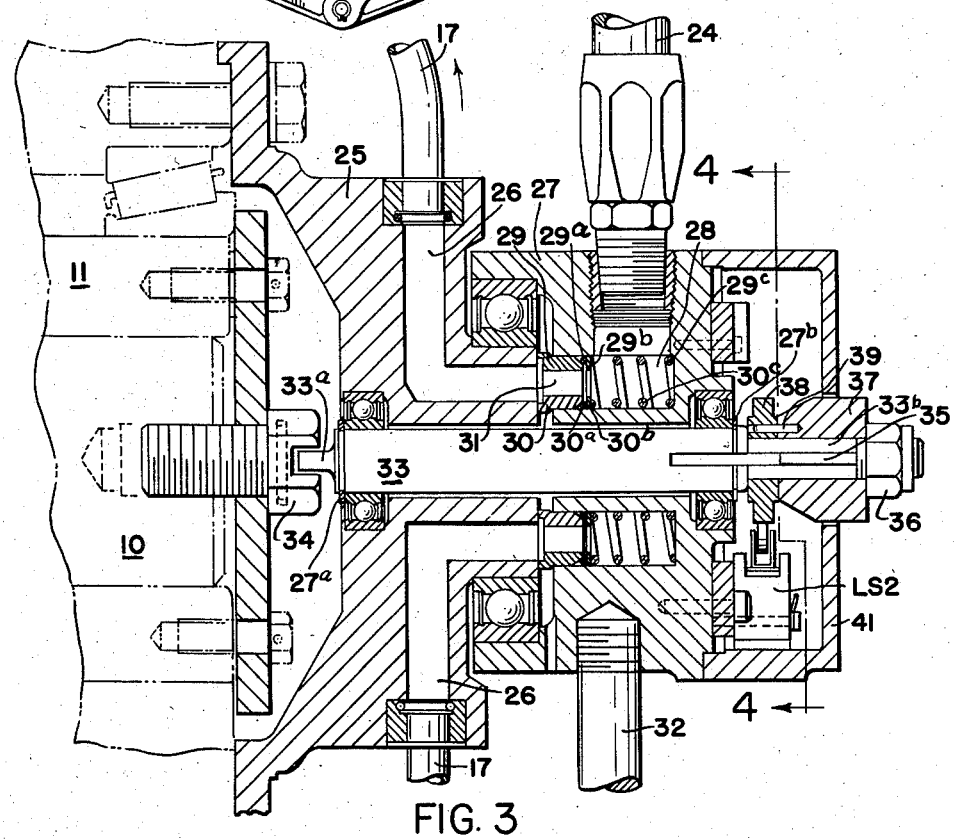
Fig. 3 is an axial section, on a large scale, of parts inclusive of the rotary-seal and timing mechanism.

The rotary-seal device comprises a fluid-conducting rotor member 25, Figs. 1 and 3, coaxially bolted to and projecting axially from the belt-pulley 14 and formed with air passages 26, 26 leading from its outer end face to the respective bag-charging and venting pipes 17.

The rotor member 25 is journaled in a fluid-conducting stator member 27 into which the non-rotary fluid-supply and discharge pipe 24 is coupled.

Internally the stator member 27 is formed with an annular guideway 28, in communication with the pipe 24 and open toward the rotor member 25, for a concentric pair of carbon slip-seal rings 29, 30 defining between them an annular flow passage 31, the carbons being adapted to seal against a slip-seal face formed on the adjacent end of the rotor member 25, respectively outward from and inward from the mouths of the rotor's passages 26, in a known manner. The carbon rings are respectively provided with the usual static-seal O-rings 29$^a$, 30$^a$, spring-seat washers 29$^b$, 30$^b$, and backing springs 29$^c$, 30$^c$.

To prevent rotational play of the stator structure, the stator member 27 preferably is provided with a stabilizing stem 32 adapted to be fixed to or associated with a stationary part of the machine, not shown.

An axial timer shaft 33 is journaled in both the rotor member 25 and the stator member 27, is retained against axial displacement by snap-rings 27$^a$, 27$^b$, and is compelled to rotate with the crank-shaft 10 by reason of a rectangular projection 33$^a$ extending, with slight play, into a slot formed in the head of a bolt 34 screwed into the end of the crank-shaft, the play compensating for slight misalignments of the crank-shaft 10 and the timer shaft 33.

At its outer end the timer shaft 33 has an extension 33$^b$ of relatively small diameter upon the end of which is secured, by a key 35 and a nut 36, a driving head 37 for a timer cam 38, rotatable for adjustment upon the reduced shaft portion 33$^b$, the head having a projecting driving pin 39 insertable selectively in one or another of a series of spaced holes 40, 40, Fig. 4, in the cam, according to the speed to be given to the press, for avoidance of excessive overrun of the crankshaft 10 of the press and its associated parts at any particular speed of operation of the press. The cam has a flat 38$^a$ as its timing element.

The timing device comprises, in association with the parts just described, a centrally apertured cap member 41 spacedly surrounding the driving head 37 and, within the cap member, micro limit switches Nos. LS1 and LS2, associated with the cam 38 and constituting parts of a suitable electric system for appropriately controlling the operation of the press by timed actuation of the three-way solenoid control valve 23, as above described.

Variations of the electrical system are of course possible, but the one preferably employed is diagrammatically illustrated in Fig. 4, in which:

The micro limit switches, No. LS1 and No. LS2, are closed when their rollers are on the rise of the cam;
The 1CR2 contactor is normally open;
The 2CR2 contactor is normally open;
The 3CR2 contactor is normally closed;
Both the CR1 contactors are normally open;
The three-way solenoid valve is normally closed;
The stop button is normally closed; and
The run button has two sets of contacts—one set normally open and one set normally closed.

The press of course is to be stopped in full open condition, with its moving upper member at its highest position, for example.

The sequence of operation is as follows:

Current is provided by lines L1 and L2 as indicated in the diagram. This causes current to pass from line 1 through stop button, the normally closed contactors of the run button, 3CR2 and the coil of CR1. Energizing CR1 coil causes 1CR1 contactor and the 2CR1 contactor to close.

Next, the operator presses the run button. This then allows current to flow from line 1 through stop button, the run button, and closed 2CR1 contactor and to energize coil of CR2. This causes all CR2 contactors to shift, i.e., 1CR2 to close, 2CR2 to close and 3CR2 to open.

When 1CR2 closed, this allowed current to flow from line 1 through 1CR2 and through the coil of the normally closed solenoid valve to open and air to pass through it to engage the clutch and disengage the brake.

The press now starts its stroke. Considering when the closed solenoid valve to line 2. This causes normally ram of the press is at the top as 0 degrees, the flat of the cam, which operates limit switches 1 and 2, is set at approximately 300 degrees.

Limit switch No. 1 is located approximately 90 degrees ahead of limit switch No. 2 so that it will always be opened by the flat of the cam first. Limit switch No. 1's primary function is to obtain non-repeat protection, i.e., the press will not double stroke even though the operator keeps his hands on the start button. This non-repeat protection is obtained when the 3CR2 contactor is opened by the operator energizing the CR2 coil by pressing the run button.

A hold-in circuit for the CR1 coil is set up from line 1 through the stop button, the jumper on the run button, the closed 1CR1 contactor, the closed limit switch LS1, and the CR1 coil to line 2.

When the limit switch LS1 opens, this interrupts the hold-in circuit of the CR1 coil and causes the 1CR1 contactor and the 2CR1 contactor to open.

When the 1CR1 contactor is opened, the CR1 coil cannot be re-energized until the operator releases the run button, and the open 3CR2 contactor closes, when the CR2 coil is de-energized by limit switch LS2 opening the CR2 coil interlock circuit from line 1, through the closed limit switch LS2, the closed 2CR2 contactor, and the CR2 coil, to line 2.

If the operator does not release the run button, the open 2CR1 contactor will prevent the CR2 coil from being energized by the run button, thus preventing the press from double stroking.

When limit switch No. 2 is opened at 300 degrees, this breaks circuit of CR2 coil and opens 1CR2, which de-energizes the coil of the solenoid valve and causes press to stop.

To obtain another stroke, the operator must release his hands from the run button and again push the run button.

In the appended claims, with regard to the specific embodiment shown in the drawings, "means for drivingly associating" the rotor refers to the attachment flange of the rotor member 25 by which it is bolted to the clutch member 14; "timer means" refers to the cam 28, which, with the driving head 37 and timer shaft 33, is in journaled relation to both the stator and the rotor; "means for drivingly associating" the timer means refers to the torque-transmitting elements 33a and 34; "means associated with said timer means for effecting timed stopping" refers to the limit switches LS1 and LS2; and "means for holding said stator, rotor and timing means in assembled relation as a self-contained unit" refers to the snap-rings 27a and 27b, which hold the stator member 27, the rotor member 25 and the timer shaft 33 against axial separation of any of the elements of the self-contained unit.

Various modifications are possible within the scope of the invention as defined in the appended claims.

I claim:

1. A rotary-seal and timing assembly comprising a fluid-conducting stator and a fluid-conducting rotor having, and being in closed communication with each other through, respective annular slip-seal faces which seal against each other, said rotor having means for drivingly associating it with a rotative machine part, rotative timer means in journaled relation to both said stator and said rotor and having means for drivingly associating it with another rotative machine part, means associated with said timer means for effecting timed stopping of the machine part with which said timer means is so associated, and means for holding said stator, rotor and timer means in assembled relation as a self-contained unit apart from, and for mounting it upon, a machine having a pair of relatively-rotative rotary parts, with the said rotor and the said timer means drivingly associated respectively with different ones of the said relatively-rotative rotary parts.

2. An assembly as defined in claim 1 in which the means for drivingly associating the timer means with the second mentioned rotative machine part comprises a shaft extending axially through the defined slip-seal faces, the timer means being secured upon said shaft at one side of said faces and the shaft having at the other side of said faces means for drivingly associating the said shaft with the said second mentioned rotative machine part.

3. An assembly as defined in claim 2 and including means for holding the defined timer means in different rotative positions in relation to the defined shaft.

References Cited in the file of this patent

UNITED STATES PATENTS

| 1,869,085 | Williamson | July 26, 1932 |
|---|---|---|
| 2,213,000 | Fawick | Aug. 27, 1940 |
| 2,469,588 | Aschauer | May 10, 1949 |
| 2,559,195 | May | July 3, 1951 |
| 2,585,234 | Eason | Feb. 12, 1952 |
| 2,697,470 | Sampatacos et al. | Dec. 21, 1954 |
| 2,747,714 | Eason | May 29, 1956 |